US009699619B1

(12) United States Patent
Patel et al.

(10) Patent No.: US 9,699,619 B1
(45) Date of Patent: *Jul. 4, 2017

(54) TRACKING OF AN OBJECT OF INTEREST BASED ON WIRELESS LOCATION ESTIMATES COMBINED WITH AERIAL OR SATELLITE IMAGERY

(71) Applicant: Polaris Wireless, Inc., Mountain View, CA (US)

(72) Inventors: Mahesh B. Patel, Saratoga, CA (US); Kartick Sekar, San Jose, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/259,918

(22) Filed: Sep. 8, 2016

Related U.S. Application Data

(63) Continuation of application No. 14/792,087, filed on Jul. 6, 2015, now Pat. No. 9,473,898.

(51) Int. Cl.
*H04W 24/00* (2009.01)
*H04W 4/02* (2009.01)
*G01S 5/02* (2010.01)

(52) U.S. Cl.
CPC ........... *H04W 4/028* (2013.01); *G01S 5/0263* (2013.01); *G01S 5/0294* (2013.01); *H04W 4/027* (2013.01)

(58) Field of Classification Search
CPC ............. H01J 37/32183; H01J 37/244; H04W 4/028; H04W 4/027; G01S 5/0263; G01S 5/0294

USPC ... 455/456.1, 436, 456.2, 456.3, 437, 404.2, 455/456.5, 457, 446, 418
See application file for complete search history.

(56) References Cited

U.S. PATENT DOCUMENTS 9,473,898 B1 * 10/2016 Patel ................... H04W 4/028
2006/0240843 A1 10/2006 Spain, Jr.
2012/0249787 A1 10/2012 Allegra

OTHER PUBLICATIONS

Patel, Dhaval, "Non-final Office Action", dated May 13, 2016, issued in counterpart U.S. Appl. No. 14/792,087.
Patel, Dhaval, "Notice of Allowance", dated Aug. 26, 2016, issued in counterpart U.S. Appl. No. 14/792,087.

\* cited by examiner

*Primary Examiner* — Dhaval Patel
(74) *Attorney, Agent, or Firm* — McGeary Cukor, LLC; Kenneth Ottesen; Jason Demont

(57) ABSTRACT

An improved method of tracking an object of interest. The tracking that is enabled by the disclosed tracking engine is based on location estimation of a wireless terminal combined with aerial or satellite imagery of an object of interest, in which a relationship has been determined to exist between the wireless terminal and the object of interest. In some tracking scenarios, a wireless telecommunications network can be used to direct an image-based surveillance system where to start observing, as an object of interest heads away from a heavily populated area or other area with satisfactory wireless coverage. In some other tracking scenarios, the trajectory of the object as derived from the image data enables the tracking engine to target a specific portion of the wireless network to utilize in generating the location estimates, thereby reducing the resource utilization of the wireless network and tracking engine.

17 Claims, 9 Drawing Sheets

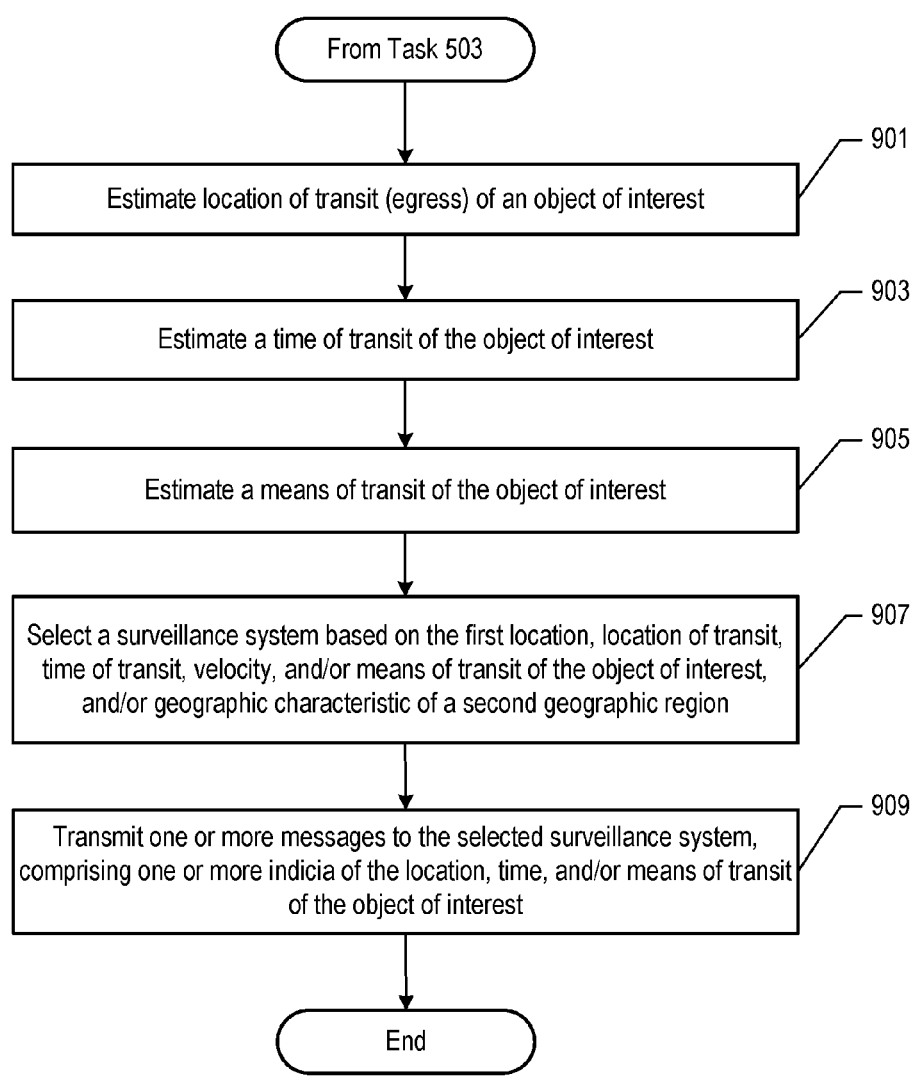

TRACKING OF AN OBJECT OF INTEREST BASED ON WIRELESS LOCATION ESTIMATES COMBINED WITH AERIAL OR SATELLITE IMAGERY

CROSS-REFERENCE TO RELATED APPLICATION(S)

This application is related to U.S. patent application Ser. No. 14/792,087, filed on Jul. 6, 2015, which is incorporated herein by reference.

FIELD OF THE INVENTION

The present invention relates to telecommunications in general, and, more particularly, to tracking based on location estimation of a wireless terminal combined with aerial or satellite imagery of an object of interest.

BACKGROUND OF THE INVENTION

An important distinction of wireless telecommunications over wireline telecommunications is that the user of the wireless terminal is afforded the opportunity to use his or her terminal anywhere. A disadvantage of wireless telecommunications lies in that fact that because the user is mobile, an interested party might not be able to readily ascertain the location of the user.

Such interested parties might include both the user of the wireless terminal and a remote party. There are a variety of reasons, not discussed here, why the user of a wireless terminal might be interested in knowing his or her location. In various scenarios, however, it is critical that a remote party know the location of the user. In a first scenario, for example, the recipient of an E 9-1-1 emergency call from a wireless terminal might be interested in knowing the location of the wireless terminal so that emergency services vehicles can be dispatched to that location. In a second scenario, a law enforcement agency or some other organization might be conducting surveillance on the user of the wireless terminal, by tracking the location of the wireless terminal over time. Notably, in certain situations the user might not necessary want to be tracked, such as when the user is engaged in illegal activity including drug trafficking, kidnapping, and terrorism.

There are many techniques in the prior art for estimating the location of a wireless terminal. In accordance with some techniques, the location of a wireless terminal is estimated, at least in part, from measurements that are reported by the wireless terminal. The reported measurements are of radio signals measured by the wireless terminal that are transmitted by one or more base stations and, in some cases, by Global Positioning System (GPS) satellites. Some techniques rely on signal-strength measurements, while some other techniques rely on time-based measurements, while still some other techniques rely on other types of measurements. In order for these estimation techniques to work, at least some of the transmitted signals have to be strong enough to allow for accurate measurement by the wireless terminal and for reliable processing by the particular technique.

Not surprisingly, when wireless coverage is spotty or nonexistent in a geographic region, such as in a sparsely populated or infrequently travelled area, at least some location estimation techniques in the prior art are incapable of providing a reliable location estimate of a wireless terminal, much less a series of such estimates. Consequently, tracking systems that rely on such location estimates encounter problems with providing reliable surveillance of wireless terminal users.

SUMMARY OF THE INVENTION

The present invention provides an improved method of tracking an object of interest, such as a person or a vehicle, without at least some of the disadvantages associated with techniques in the prior art. The tracking that is enabled by the tracking engine and methods disclosed herein is based on location estimation of a wireless terminal combined with aerial or satellite imagery of an object of interest, in which a relationship has been determined to exist between the wireless terminal and the object of interest. Such a relationship can be one of colocation, for example and without limitation.

An image-based surveillance system, such as an unmanned aerial vehicle (UAV) system or a satellite system, is capable of observing objects of interest in sparsely populated or infrequently travelled areas, among other areas. The image-based system observes these objects and, in some cases, detects these objects and their movements based on imagery analysis, and provides imagery of and information relevant to the objects of interest, to the tracking engine of the illustrative embodiment. The tracking engine then attempts to track one or more of the objects of interest, in part by using the provided imagery and other information, and also by generating location estimates of one or more wireless terminals that are believed to be related to the objects of interest.

In particular, where a geographic region does not have adequate wireless coverage, the image-based system provides imagery, and the analysis of the imagery leads to determining a possible trajectory that one or more objects of interest might be following. The estimated trajectory is used in accordance with the illustrative embodiment to estimate a location of transit into a geographic region of satisfactory wireless coverage, such as a populated or well-travelled area. This estimated location of "ingress" transit is then used to determine which arriving wireless terminal or terminals are to be tracked via location estimation within the telecommunications infrastructure of the more heavily populated or traveled area.

Conversely, the tracking engine of the illustrative embodiment might already be tracking one or more of objects of interest within the geographic region having satisfactory telecommunications infrastructure, in part by generating location estimates of one or more wireless terminals related to the objects of interest. In some embodiments of the present invention, the tracking can be supplemented with imagery from the surveillance system, although this is not required. When one or more of the objects then appear to be heading toward the boundary of the populated geographic region, the tracking engine estimates a location of transit away from this region and into the geographic region of inadequate wireless coverage. This estimated location of "egress" transit is then used to determine what information is to be provided to an image-based surveillance system in order to continue the tracking of the departing objects. In some embodiments of the present invention, the tracking engine also selects the particular surveillance system that will be utilized to continue the tracking.

The tracking system of the illustrative embodiment offers various advantages over at least some techniques in the prior art. In some prior-art techniques that provide surveillance of objects of interest within geographic regions, the sole mechanism is to utilize wireless networks, which have the limitation of not covering vast geographic regions, especially sparsely populated areas such as some international borders or deserts within a country. In accordance with the illustrative embodiment, however, wireless networks can be used to direct an image-based surveillance system where to start observing as an object of interest heads away from a heavily populated area or other area with satisfactory wireless coverage.

At least some prior-art tracking techniques that mainly use aerial or satellite imagery have limitations as well. For example, an object of interest is generally easier to observe visually when it is in a sparely populated area or during the daytime, or both, but can be difficult to observe within a heavily populated area having obstructions (e.g., buildings, etc.) or at night. In accordance with the illustrative embodiment, however, the estimated location of wireless terminals within a coverage area augments the imagery provided by image-based surveillance. Also, at least some image-based systems in the prior art require guidance on where to look, at least initially. The tracking engine of the illustrative embodiment provides such guidance to the image-based system.

Additionally, the trajectory of the object as derived from the image data enables the tracking engine to target a specific portion of the wireless network to utilize in generating the location estimates. This can reduce the resource utilization of the wireless network and tracking engine.

An application of the illustrative embodiment of the present invention concerns the tracking of an object of interest, as in a lawful surveillance situation. However, as those who are skilled in the art will appreciate, after reading this specification, that embodiments of the present invention can be used for applications other than tracking an object of interest.

A first illustrative method of surveillance comprises: estimating, by a server computer, a first location of a first wireless terminal within a first geographic region, wherein the first geographic region comprises a wireless coverage area that is defined by service coverage provided by one or more base stations, wherein the estimating of the first location is based on a location estimation technique that is capable of providing a first level of accuracy at the first location, and wherein the location estimation technique is based on radio signals exchanged between the first wireless terminal and the one or more base stations; determining, by the server computer, a relationship between the first wireless terminal and an object of interest; estimating, by the server computer, a location of transit of the object of interest from the first geographic region into a second geographic region based on i) the first location of the first wireless terminal and ii) the relationship, wherein any estimating of location attempted within the second geographic region via the location estimation technique is characterized as having a lower level of accuracy than the first level; and transmitting, by the server computer, a message to an image-based surveillance system, wherein the message comprises a first indicium based on the location of transit of the object of interest.

A second illustrative method of surveillance comprises: receiving, by a server computer, an indication of an appearance of a first wireless terminal within a first geographic region, wherein the first geographic region comprises a wireless coverage area that is defined by service coverage provided by one or more base stations; determining, by the server computer, a relationship between the first wireless terminal and an object of interest; generating, by the server computer, a series of estimates of locations of the object of interest within the first geographic region within a given time interval, via a location estimation technique that is based on radio signals exchanged between the first wireless terminal and the one or more base stations, and wherein the number of location estimates generated within the given time interval is based on the first wireless terminal exhibiting a predetermined pattern; and transmitting, by the server computer, at least one of the series of estimates to a location application.

A third illustrative method of surveillance comprises: receiving, by a server computer, a series of images comprising an object of interest, wherein the object of interest is in motion in relation to the background in the series of images, and wherein the object is present within a second geographic region; transmitting, by the server computer, a mobile-terminated location request (MTLR), corresponding to a first wireless terminal that is being served by a first base station in a first geographic region, wherein the first geographic region comprises a wireless coverage area that is defined by service coverage provided by one or more base stations that comprise the first base station, and wherein the transmitting is based on the series of images; estimating, by the server computer, a first location of the first wireless terminal, wherein the estimating of the first location is based on a location estimation technique that is capable of providing a first level of accuracy at the first location, and wherein the location estimation technique is based on radio signals exchanged between the first wireless terminal and the one or more base stations, and wherein the radio signals are made available in response to the MTLR; and transmitting, by the server computer, the first location to a location application.

BRIEF DESCRIPTION OF THE DRAWINGS

FIG. 9 depicts a flowchart of the salient tasks that are performed in tracking object of interest 401 out of geographic region 210, by providing information to surveillance system 114.

DETAILED DESCRIPTION

Figure 1:
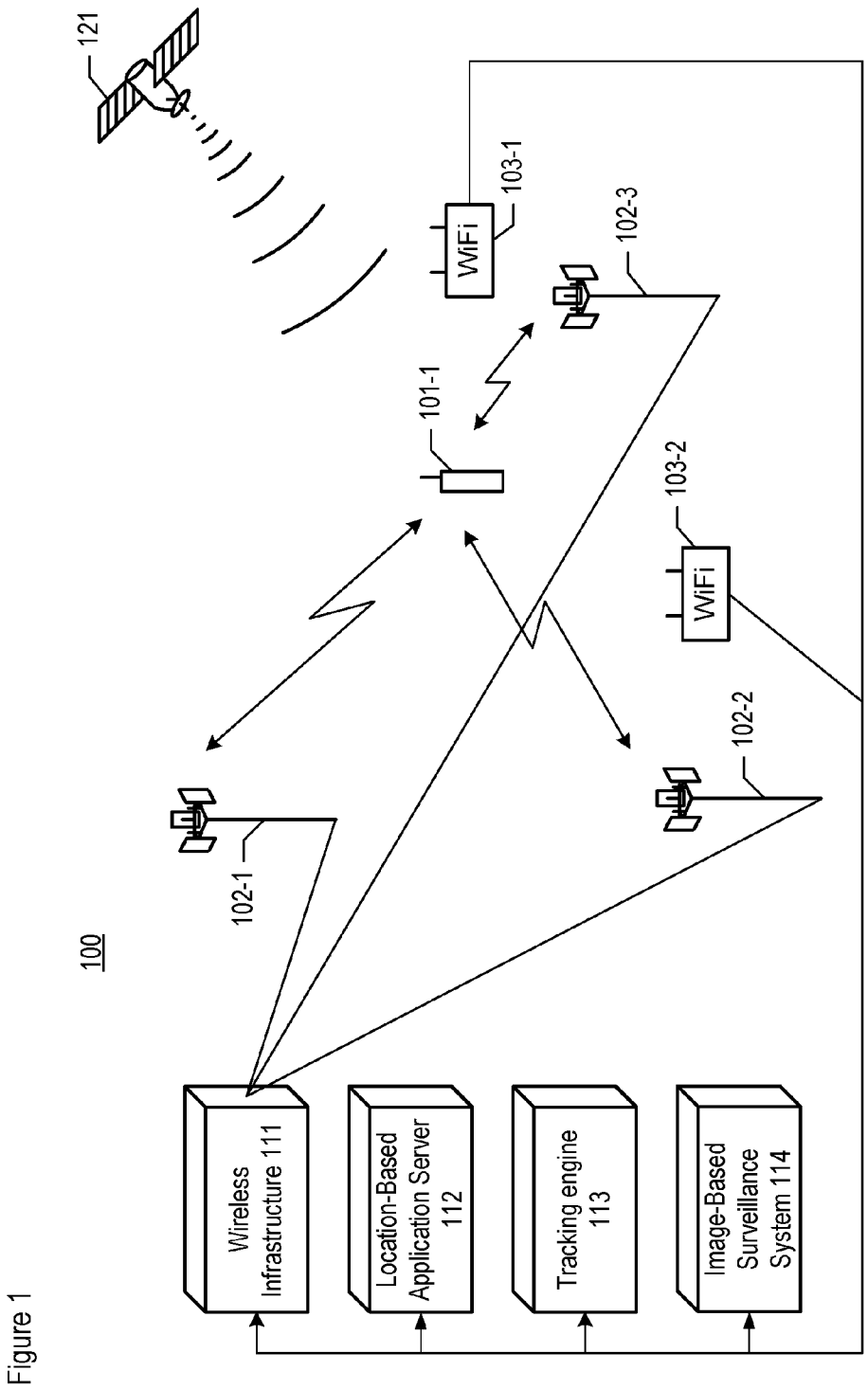
FIG. 1 depicts a diagram of the salient components of telecommunications system 100 in accordance with the illustrative embodiment of the present invention.

Base station—For the purposes of this specification, the term "base station" is defined as equipment that provides the wireless interface between one or more wireless terminals and the wider telecommunications network (e.g., a switching center, the Public Switched Telephone Network [PSTN], the Internet, a different part of a wireless network, etc.), in part by creating one or more coverage areas within which a wireless terminal can acquire wireless service. Base stations are also commonly referred to by a variety of alternative names such as access points, nodes, network interfaces, etc.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Estimate—For the purposes of this specification, the infinitive "to estimate" and its inflected forms (e.g., "estimating", "estimated", etc.) should be given the ordinary and customary meaning that the terms would have to a person of ordinary skill in the art at the time of the invention.

Geographic region—For the purposes of this specification, the term "geographic region" is defined as a demarcated area of the Earth. A first and second geographic region can be demarcated from each other according to the level of wireless coverage that exists in each region, population in each region, terrain in each region, man-made structures in each region, travel-related infrastructure in each region, and so on, for example and without limitation, and in any combination thereof.

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Location—For the purposes of this specification, the term "location" is defined as a zero-dimensional point, a finite one-dimensional path segment, a finite two-dimensional surface area, or a finite three-dimensional volume.

Object of interest—For the purposes of this specification, the term "object of interest" is defined as a person, vehicle, or other material thing that can be seen, about which a want or need exists to know or learn more of.

Processor—For the purposes of this specification, the term "processor" is defined as hardware or hardware and software that perform mathematical and/or logical operations.

Radio signal—For the purposes of this specification, the term "radio signal" is defined as an unguided (i.e., wireless) transmission having an electromagnetic frequency of less than 600 GHz.

Surveillance—For the purposes of this specification, the term "surveillance" is defined as the monitoring of the behavior, activities, or other changing information, of one or more objects, including people, vehicles and/or other material things.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transit—For the purposes of this specification, the term "transit" is defined as passing across or through something, such as a boundary between two geographic regions.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless coverage area—For the purposes of this specification, the term "wireless coverage area" is defined as the geographic area within which a carrier or a set of equipment, or both, provides wireless service.

Wireless terminal—For the purposes of this specification, the term "wireless terminal" is defined as a device that is capable of telecommunications without a wire or tangible medium. A wireless terminal can be mobile or immobile. A wireless terminal can transmit or receive, or transmit and receive. As is well known to those skilled in the art, a wireless terminal is also commonly called a cell phone, a pager, a wireless transmit/receive unit (WTRU), a user equipment (UE), a mobile station, a fixed or mobile subscriber unit, a pager, a cellular telephone, a personal digital assistant (PDA), a computer, and any other type of device capable of operating in a wireless environment are examples of wireless terminals.

Figure 2:
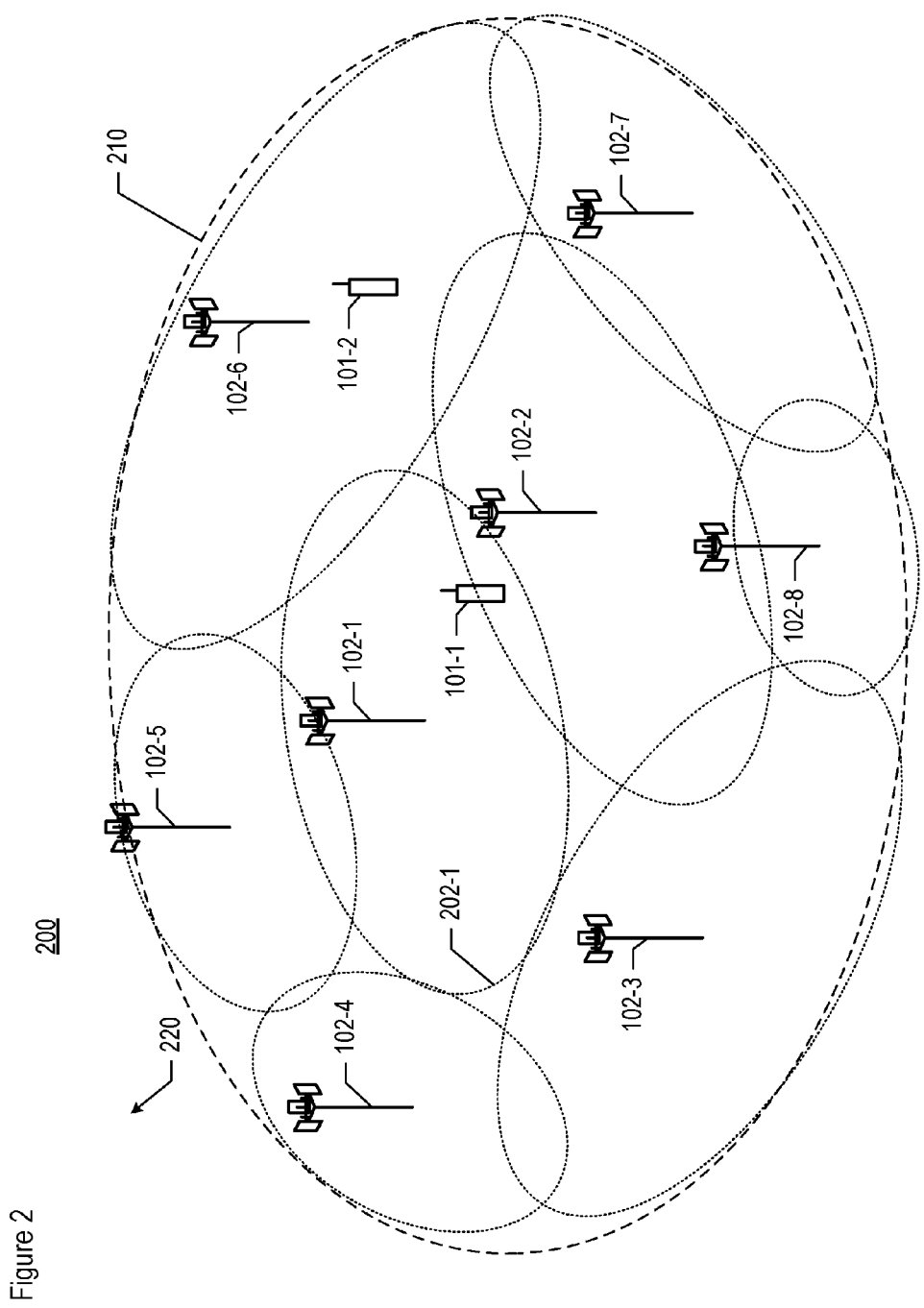
FIG. 2 depicts surveillance area 200, which comprises geographic regions 210 and 220.

FIGS. 1 and 2 depict diagrams of the salient components of telecommunications system 100 in accordance with the illustrative embodiment of the present invention. Telecommunications system 100 comprises: wireless terminals 101-1 through 101-3; cellular base stations 102-1 through 102-8; Wi-Fi base stations 103-1 and 103-2; wireless infrastructure 111; location-based application server 112; tracking engine 113; image-based surveillance system 114; and GPS constellation 121, interrelated as shown. In particular, wireless infrastructure 111, location-based application server 112, tracking engine 113, image-based surveillance system 114, and Wi-Fi base stations 103-1 and 103-2 are all connected to one or more interconnected computer networks (e.g., the Internet, a local-area network, a wide-area network, etc.) and, as such, can exchange data in well-known fashion.

Wireless terminal 101-$m$, wherein m can have a value of 1 through M, comprises the hardware and software necessary to perform the tasks described below and in the accompanying figures. Furthermore, wireless terminal 101-$m$ is mobile and can be at any location within surveillance area 200 in FIG. 2, and at any time. Wireless terminal 101-$m$ is capable of providing bi-directional voice, data, and/or video telecommunications service to a user (not shown), but it will be clear to those skilled in the art, after reading this disclosure, how to make and use embodiments of the present invention in which wireless terminal 101-$m$ provides a different set of services.

In accordance with the illustrative embodiment, wireless terminal 101-$m$ is capable of transmitting one or more radio signals—that can be received by one or more of cellular base stations 102-1 through 102-8 and Wi-Fi base stations 103-1 and 103-2—in accordance with specific parameters (e.g., signal strength, frequency, coding, modulation, timing offset, etc.), in well-known fashion, and of transmitting at least some of those parameters, which can be provided to tracking engine 113, as well as other information described below. Additionally, wireless terminal 101-$m$ is capable of receiving one or more radio signals from one or more of cellular base stations 102-1 through 102-8, Wi-Fi base stations 103-1 and 103-2, and GPS constellation 121, in well-known fashion.

Wireless terminal 101-$m$ is also capable of identifying each radio signal it receives, in well-known fashion, and of transmitting the identity of each signal it receives, which can be provided to tracking engine 113. Wireless terminal 101-$m$ is further capable of measuring one or more location-dependent traits of each radio signal it receives, in well-known fashion, and of transmitting each measurement it generates, which can be provided to tracking engine 113.

As depicted in FIG. 2, the illustrative embodiment features telecommunications system 100 as comprising three wireless terminals; however, it will be clear to those skilled in the art after reading this disclosure how to make and use alternative embodiments of the present invention that comprise any number of wireless terminals 101-1 through 101-M, wherein M is a positive integer. In any event, it will be clear to those skilled in the art how to make and use wireless terminals 101-1 through 101-3.

Cellular base stations 102-1 through 102-8 communicate with wireless infrastructure 111 via wireline and with wireless terminal 101-$m$ via radio in well-known fashion. In accordance with the illustrative embodiment of the present invention, cellular base stations 102-1 through 102-8 are terrestrial, immobile, and within geographic region 210. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 210.

Each cellular base station 102-$n$, wherein n can have a value of 1 through N, comprises the hardware and software necessary to be 3GPP-compliant. For example and without limitation, cellular base station 102-$n$ is capable of continually:
 a. receiving one or more radio signals transmitted by wireless terminal 101-$m$, and
 b. identifying each radio signal transmitted by wireless terminal 101-$m$, in well-known fashion, and of transmitting the identity of those signals to tracking engine 113, and
 c. measuring one or more location-dependent traits of each radio signal transmitted by wireless terminal 101-$m$, in well-known fashion, and of transmitting the measurements to tracking engine 113, and
 d. transmitting one or more signals to wireless terminal 101-$m$ in accordance with specific parameters (e.g., signal strength, frequency, coding, modulation, etc.), in well-known fashion, and of transmitting those parameters to tracking engine 113.

Although the illustrative embodiment features telecommunications system 100 as comprising eight cellular base stations, it will be clear to those skilled in the art after reading this disclosure how to make and use alternative embodiments of the present invention that comprise any number of cellular base stations 102-1 through 102-N, wherein N is a positive integer. In any event, it will be clear to those skilled in the art how to make and use cellular base stations 102-1 through 102-8.

As depicted in greater detail in FIG. 2, which includes surveillance area 200, cellular base stations 102-1 through 102-8 provide service coverage for one or more wireless terminals. Each of base station 102-$n$ provides a coverage area, such as coverage area 202-1 provided by base station 102-1. The individual coverage areas might or might not overlap with one another. Notably, some of the equipment of telecommunications system 100 is situated within surveillance area 200, and some of the equipment might be situated outside of area 200.

First geographic region 210 within surveillance area 200 comprises the individual coverage areas of cellular base stations 102-1 through 102-8. Region 210 might be associated with a more densely populated area and, as such, warrants wireless coverage that is suitable for the number of wireless users within such an area. In contrast, second geographic region 220 within area 200, depicted as surrounding region 210, might be associated with a more sparsely populated area. As such, region 220 warrants less wireless infrastructure than allocated for region 210 and might, in fact, have no wireless infrastructure.

Wi-Fi base stations 103-1 and 103-2 communicate with wireless terminal 101-$m$ via radio in well-known fashion. Wi-Fi base stations 103-1 and 103-2 are terrestrial, immobile, and within geographic region 120. Each of Wi-Fi base stations 103-1 and 103-2 are capable of continually:
 a. receiving one or more radio signals transmitted by wireless terminal 101-$m$, and
 b. identifying each radio signal transmitted by wireless terminal 101-$m$, in well-known fashion, and of transmitting the identity of those signals to tracking engine 113, and
 c. measuring one or more location-dependent traits of each radio signal transmitted by wireless terminal 101-$m$, in well-known fashion, and of transmitting the measurements to tracking engine 113, and
 d. transmitting one or more signals to wireless terminal 101-$m$ in accordance with specific parameters (e.g., signal strength, frequency, coding, modulation, etc.), in well-known fashion, and of transmitting those parameters to tracking engine 113.

Although the illustrative embodiment depicts telecommunications system 100 as comprising two Wi-Fi base stations, it will be clear to those skilled in the art after reading this disclosure how to make and use alternative embodiments of the present invention that comprise any number of Wi-Fi base stations. In any event, it will be clear to those skilled in the art how to make and use Wi-Fi base stations 103-1 and 103-2.

The illustrative embodiment depicts telecommunications system 100 as comprising a combination of cellular base stations and WiFi base stations. It will be clear to those skilled in the art, however, after reading this disclosure how to make and use alternative embodiments of the present invention that rely on a different type or types of wireless base stations than cellular and/or WiFi.

Wireless infrastructure 111 comprises a switch that orchestrates the provisioning of telecommunications service to wireless terminal 101-$m$ and the flow of information to and from tracking engine 113, as described below and in the accompanying figures. As is well known to those skilled in the art, wireless switches are also commonly referred to by other names such as mobile switching centers, mobile telephone switching offices, routers, etc.

Location-based application server 112 comprises hardware and software that uses the estimate of the location of wireless terminal 101-$m$—generated by tracking engine 113—in one or more location-based applications, in well-known fashion. Location-based applications are well-known in the art and provide services such as, and without limitation, E-911 routing, navigation, location-based advertising, weather alerts, and lawful surveillance.

Tracking engine 113 is a data processing system that comprises hardware and software that generates one or more estimates of the location of wireless terminal 101-$m$ as described below and in the accompanying figures. It will be clear to those skilled in the art, after reading this disclosure, how to make and use tracking engine 113. Furthermore, although tracking engine 113 is depicted in FIG. 1 as physically distinct from wireless infrastructure 111, it will be clear to those skilled in the art, after reading this disclosure, how to make and use alternative embodiments of the present invention in which tracking engine 113 is wholly or partially integrated into wireless infrastructure 111.

Tracking engine 113 is capable of estimating one or more locations of one or more wireless terminals concurrently. In accordance with the illustrative embodiment of the present invention, engine 113 uses a location estimation technique that is capable of providing a first level of accuracy at a location within region 210. The location estimation technique is based on one or more of the radio signals exchanged between the wireless terminals and the base stations as described above. The base stations, as well as corresponding coverage areas, either do not extend into region 220 or, if they do, extend into region 220 only in a limited manner. Consequently, any estimating of location that is attempted within region 220 is characterized as having a lower level of accuracy than the first level of accuracy that is available at least at some locations within region 210. Tracking engine 113 is further capable of combining the estimating of location with aerial and/or satellite imagery, as provided by surveillance system 114.

Image-based surveillance system 114 comprises hardware and software that provides image-based surveillance for one or more objects of interest throughout surveillance area 200, including aerial and/or satellite imagery, including images conveyed within one or more frames, as part of still imagery (e.g., individual photographs, etc.) or video imagery, or both. The imaging devices include imaging satellites and unmanned aerial vehicles (UAV) such as macro UAVs and micro drones, for example and without limitation. Examples of satellite imaging services include Skybox Imaging™ and DigitalGlobe™. Some imaging services (e.g., Skybox Imaging™, etc.) are capable of providing analytics, including time-dependent analytics such as automobile activity in a parking lot, airplane activity at an airport, shipping activity in a harbor, and so on.

Surveillance system 114 is further capable of telecommunicating with tracking engine 113. In particular, system 114 can receive messages from tracking engine 113 that direct system 114 to provide specified surveillance data. System 114 can transmit messages to tracking engine 113 that convey individual image frames, video frames, or analytic data, in any combination thereof.

In accordance with the illustrative embodiment of the present invention, surveillance system 114 is image-based. It will be clear to those skilled in the art, however, after reading this specification, how to make and use system 114 for the purpose of performing a different type of surveillance other than one that is image-based.

Tracking Engine 113—

Figure 3:
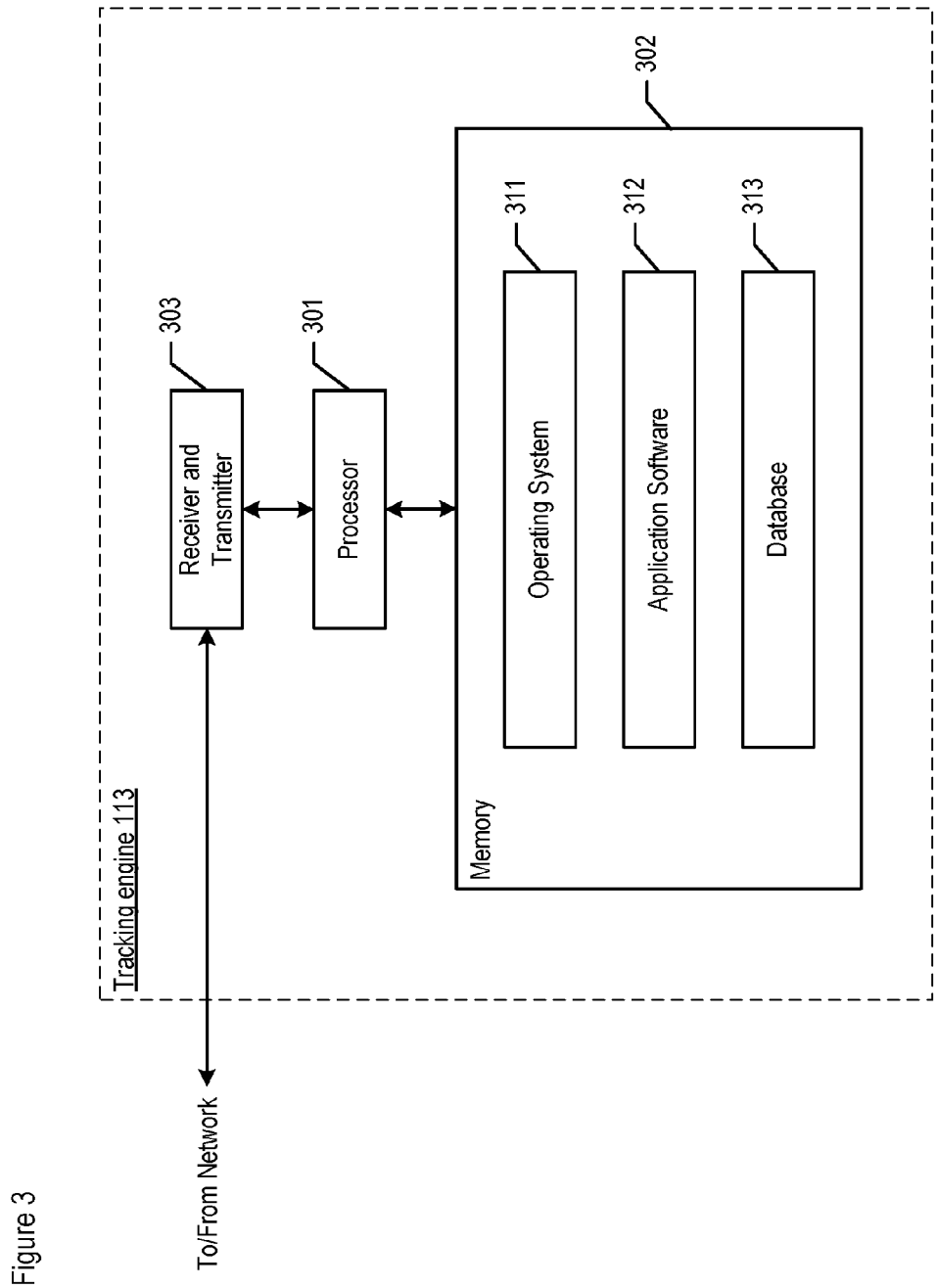
FIG. 3 depicts a block diagram of the salient components of tracking engine 113 in accordance with the illustrative embodiment of the present invention.

FIG. 3 depicts a block diagram of the salient components of tracking engine 113 in accordance with the illustrative embodiment. Tracking engine 113 comprises: processor 301, memory 302, and receiver and transmitter 303, which are interconnected as shown. In accordance with the illustrative embodiment of the present invention, tracking engine 113 is a server computer. As those who are skilled in the art will appreciate after reading this specification, however, tracking engine 113 can be a different type of data-processing system or other computing device.

Figure 5:
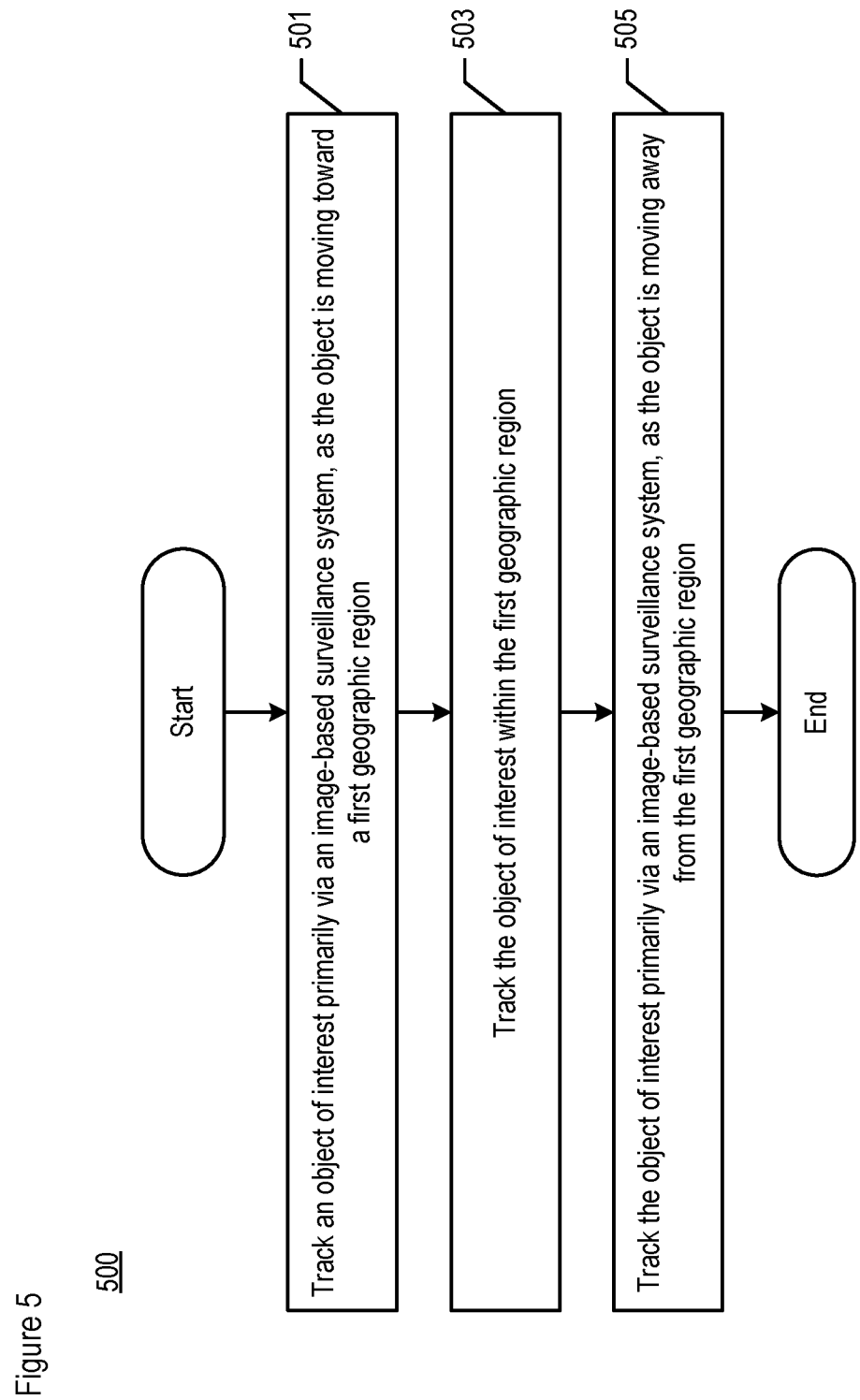
FIG. 5 depicts a flowchart of the salient tasks that are performed in tracking object of interest 401.

Processor 301 is a general-purpose processor that is configured to execute an operating system and the application software that performs the operations described herein, including the operations described in FIG. 5 and other figures. Processor 301 is capable of populating, amending, using, and managing received radio signal measurements, received images, received information concerning objects of interest, and so on. It will be clear to those skilled in the art how to make and use processor 301.

Memory 302 is a non-volatile memory that is configured to store:
  a. operating system 311, and
  b. application software 312, and
  c. database 313 for storing the received data, and for storing data concerning one or more tracked objects of interest and/or wireless terminals, as described below.

It will be clear to those skilled in the art how to make and use memory 302.

Receiver and transmitter 303 is configured to enable tracking engine 113 to receive from and transmit to one or more wireless terminals, wireless infrastructure 111, location—based application server 112, surveillance system 114, and the base stations (i.e., cellular and WiFi), in well-known fashion. It will be clear to those skilled in the art how to make and use receiver and transmitter 303.

Figure 4:
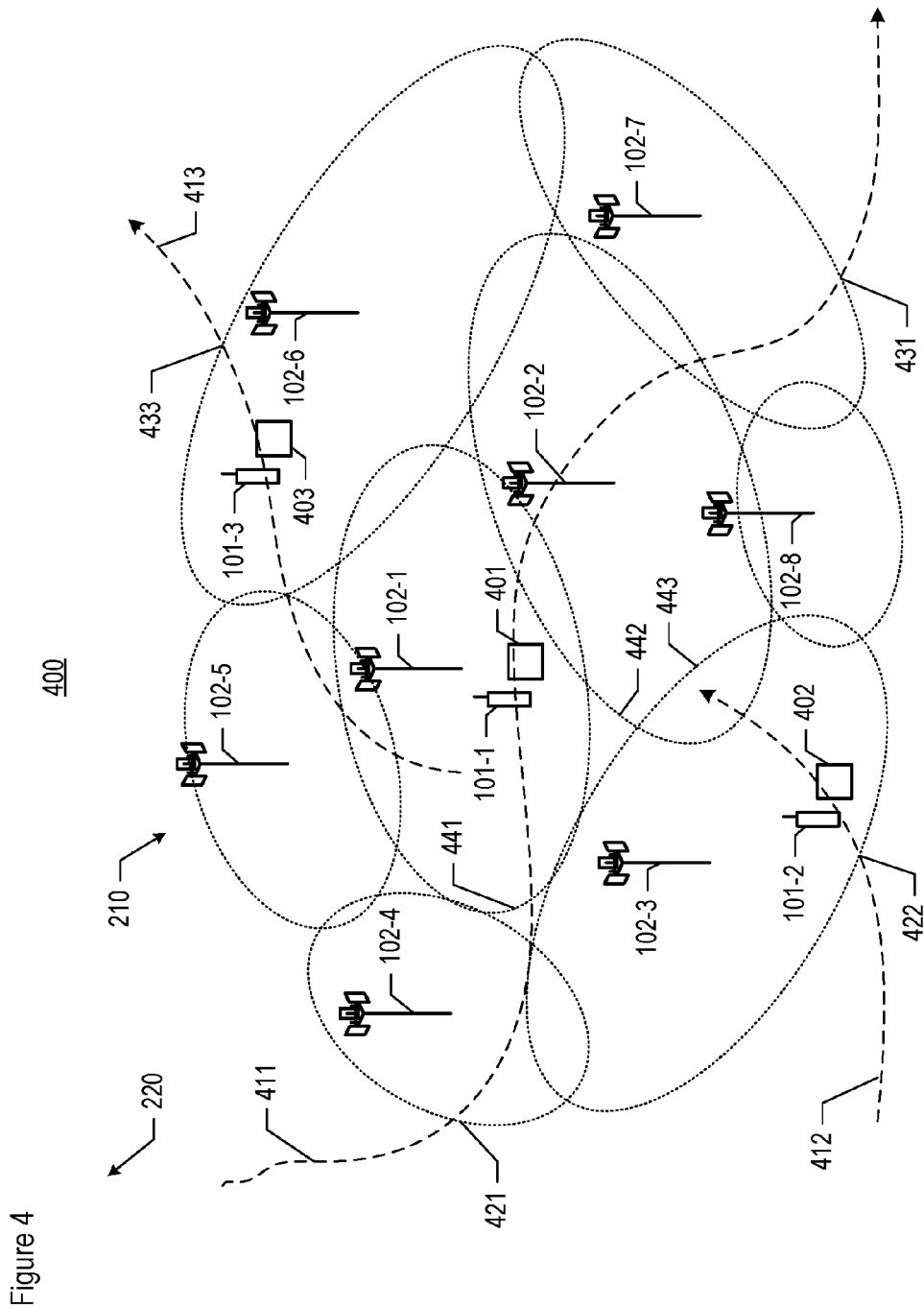
FIG. 4 depicts surveillance area 400.

FIG. 4 depicts surveillance area 400 in accordance with the illustrative embodiment of the present invention. Surveillance area 400 comprises first geographic region 210 and second geographic region 220, as described above and in FIG. 2.

The figure depicts three objects (e.g., person, vehicle, material thing, etc.) of interest taking three respective paths through surveillance area 400: objects of interest 401, 402, and 403. Object of interest 401 is depicted as travelling along path 411 toward, into, within, out of, and then away from region 210, starting initially in region 220 and ending elsewhere in region 220. As those who are skilled in the art will appreciate after reading this specification, however, object 401 can start in region 220 and end in yet a third region other than region 210 or 220. Object 401 is estimated to have a location of ingress transit 421 and a location of egress transit 431. A relationship exists between Object 401 and wireless terminal 101-1, as determined by telecommunications system 100 in accordance with the illustrative embodiment of the present invention and as explained below. For example and without limitation, object 401 is a person who is carrying terminal 101-1.

Object of interest 402 is depicted as travelling along path 412 toward, into, and within region 210, starting initially in region 220 and ending in region 210. Object 402 is estimated to have a location of ingress transit 421; no location of egress transit for object 402 has been estimated, however, if such a location even exists. A relationship exists between object 402 and wireless terminal 101-2, as determined by telecommunications system 100 in accordance with the illustrative embodiment of the present invention and as explained below. For example and without limitation, object 402 is an automotive vehicle that is carrying terminal 101-2. In this example, contact with the terminal is lost within overlapping coverage areas 442 and 443, which is provided by base stations 102-2 and 102-3, respectively. This disappearance might be explained by a power-off condition occurring, by the terminal ceasing to function (e.g., because of its destruction, etc.), or by the wireless coverage being marginal, for example and without limitation.

Object of interest 403 is depicted as travelling along path 413 within, out of, and then away from region 210, starting initially in region 210 and ending in region 220. Object 403 is estimated to have a location of egress transit 433; no location of ingress transit for object 403 has been estimated, however, if such a location even exists. A relationship exists between object 403 and wireless terminal 101-3, as determined by telecommunications system 100 in accordance with the illustrative embodiment of the present invention and as explained below. For example and without limitation, object 403 is a person who is carrying terminal 101-3 and powers-on the terminal within coverage area 441, thereby causing the terminal to make its initial appearance within this coverage area as a result of the power-on condition occurring.

Operation of the Illustrative Embodiment—

FIG. 5 depicts a flowchart of the salient tasks performed in tracking object of interest 401, in accordance with the illustrative embodiment of the present invention.

The tasks performed by telecommunications system 100 of the illustrative embodiment are depicted in the drawings (i.e., FIG. 5 and subsequent figures) as being performed in a particular order. It will, however, be clear to those skilled in the art, after reading this disclosure, that such operations can be performed in a different order than depicted or can be performed in a non-sequential order (e.g., in parallel, etc.). In some embodiments of the present invention, some or all of the depicted tasks might be combined or performed by different devices, either within tracking engine 113 or other than tracking engine 113. For example and without limitation, at least some of the depicted tasks can be performed by a gateway mobile location center (GMLC) as is known in the art, or equivalent. As another non-limiting example, a separate location engine can perform some tasks, such as those tasks related to generating location estimates. In some embodiments of the present invention, some of the depicted tasks might be omitted.

For purposes of clarity, wireless terminal 101-1, object of interest 401, and cellular base station 102-1 are used as examples of a wireless terminal and base station. However, as those who are skilled in the art will appreciate after reading this specification, the tasks described below are applicable to other wireless terminals and other base stations (e.g., WiFi, etc.) as well.

At task 501, tracking engine 113 tracks object of interest 401 primarily by using information received from surveillance system 114 in accordance with the illustrative embodiment of the present invention. In some alternative embodiments of the present invention, only surveillance system 114 tracks object 401 in this phase of tracking, in which object 401 is moving toward first geographic region 210. Task 501 is described below and in FIG. 6.

At task 503, tracking engine 113 tracks object of interest 401 within first geographic region 210, in accordance with the illustrative embodiment. Task 503 is described below and in FIGS. 7 and 8.

At task 505, tracking engine 113 tracks object of interest 401 primary via surveillance system 114 as the object is moving away from first geographic region 210. In accordance with the illustrative embodiment, engine 113 assists in this phase of tracking by providing system 114 with information about object 401. Task 505 is described below and in FIG. 9.

As those who are skilled in the art will appreciate after reading this specification, the tasks depicted in FIG. 5 can be performed on more than one object of interest concurrently. Furthermore, at any given moment tracking engine 113 can be executing different tasks for different objects of interest. Tracking engine 113 can also repeat the depicted tasks for a given object of interest.

Tracking of Object of Interest 401 Using Information Received from Surveillance System 114—

Figure 6:
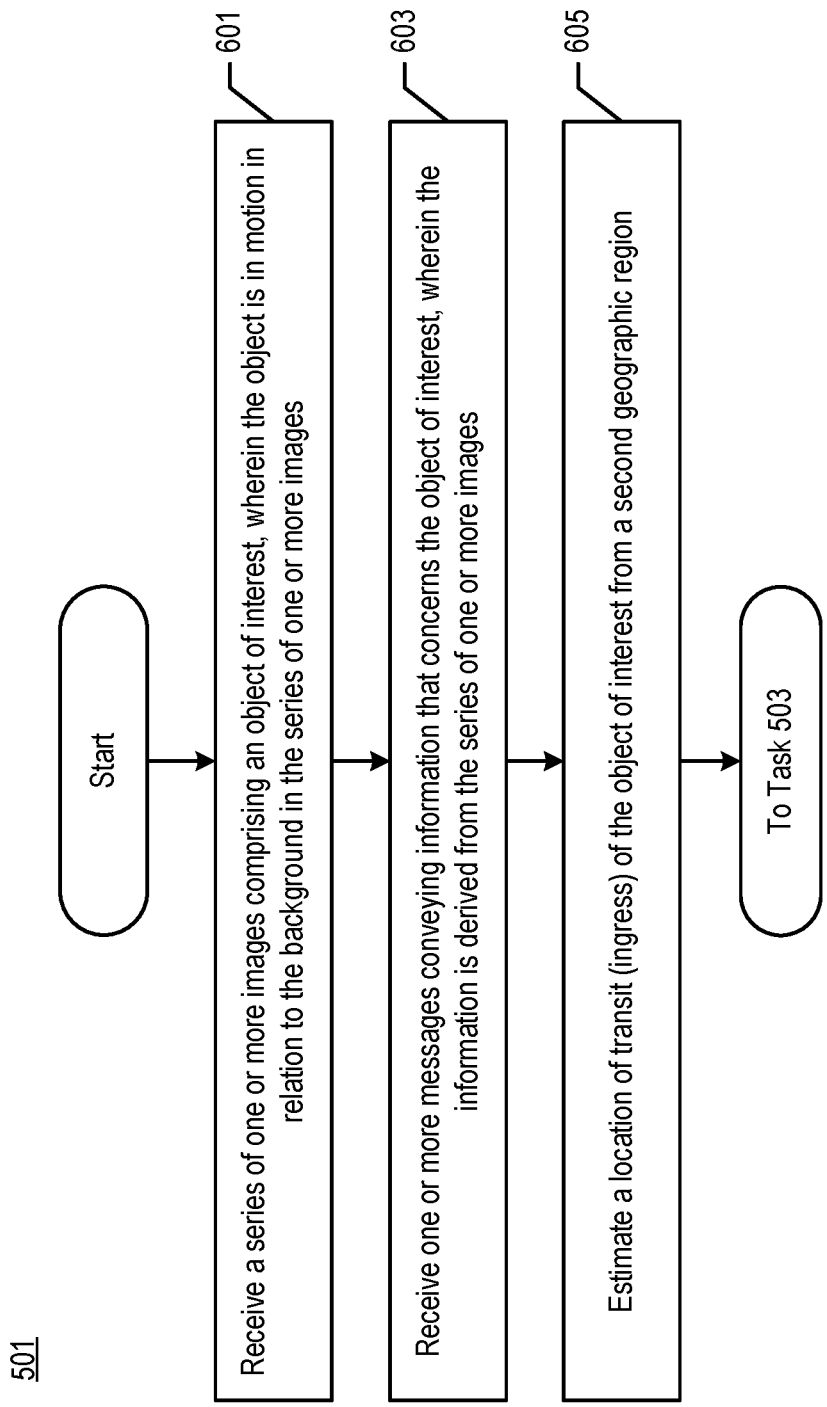
FIG. 6 depicts a flowchart of the salient tasks that are performed in tracking object of interest 401, in part by using information received from surveillance system 114.

FIG. 6 depicts a flowchart of the salient tasks performed in tracking object of interest 401, in part by using information received from surveillance system 114.

At task 601, tracking engine 113 receives a series of one or more images comprising object of interest 401. At least some of the time, object 401 is in motion in relation to the background within the series of images. Each image can be conveyed within an individual image frame or a video frame, or both. At some point in time, object 401 can be present within geographic region 220, while at another point in time object 401 can be present within region 210.

At task 603, tracking engine 113 receives one or more messages conveying information that concerns object of interest 401, wherein the information is derived from the series of one or more images. For example and without limitation, with information comprises analytics such as, while not being limited to: the object's size, the object's speed and/or direction of motion, type of motion (e.g., straight, winding, etc.), the object's color, additional objects with which the object of interest is associated, characteristics of the environment surrounding the object, and so on.

At task 605, tracking engine 113 estimates location of transit 421 of object 401. Location of transit 421 represents the location at which ingress is estimated to occur for object 401 from region 220 into region 210. Engine 113 estimates the location of transit based on the series of one or more images obtained at task 601; for example and without limitation, the estimate can be based on the motion (e.g., relatively straight, relatively winding, etc.) exhibited in the series of images, the geography (e.g., mountains, level grounds, etc.), and so on. In some embodiments of the present invention, the estimate can be based on the information about object 401 that is received at task 603. In some other embodiments of the present invention, the estimate concerning object 401 (i.e., a first arriving object of interest) can be based on any or all of the data received for object 412 (i.e., a second arriving object of interest), or even on any or all of the data estimated for object 403 (i.e., an object already within or departing from region 210).

Control of task execution then proceeds to task 503.

Tracking of Object of Interest 401 with Geographic Region 210—

Figure 7:
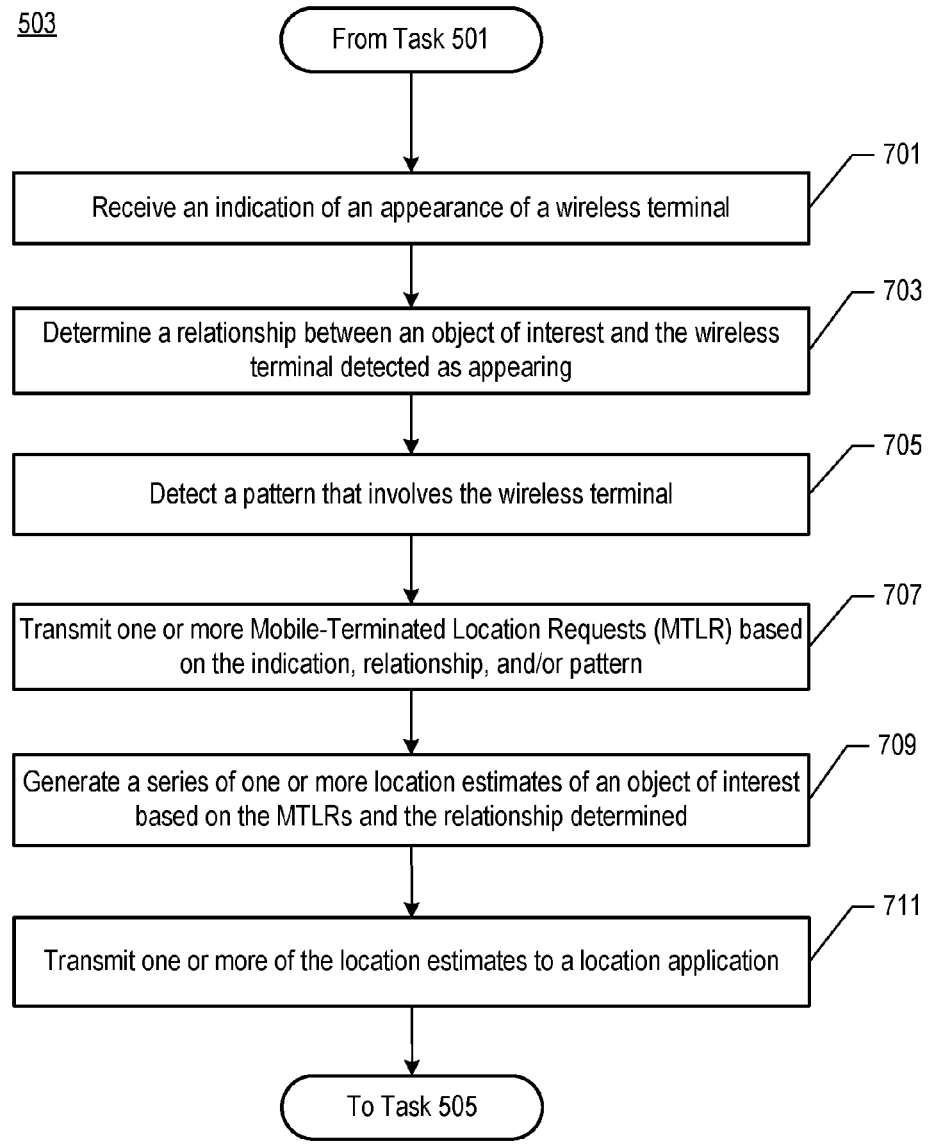
FIG. 7 depicts a flowchart of the salient tasks that are performed in tracking object of interest 401 within geographic region 210, in part by using location estimates generated by tracking engine 113.

FIG. 7 depicts a flowchart of the salient tasks performed in tracking object of interest 401 within geographic region 210, in part by using location estimates generated by tracking engine 113.

At task 701, tracking engine 113 receives an indication of an appearance within the wireless network of one or more wireless terminals, such as one or more of terminals 101-1 through 101-3, within geographic region 210. In some embodiments of the present invention, the indication signifies an initial appearance of a wireless terminal within the region and/or network, while in some other embodiments the indication signifies the first appearance of the terminal within the region and/or network within a predetermined time interval (e.g., 12 hours, 3 days, 6 months, etc.).

At task 703, tracking engine 113 determines a relationship between one or more objects of interest (e.g., object 401, etc.) and the one or more wireless terminals detected at task 701 as appearing within region 210. For example and without limitation, engine 113 can determine that a relationship exists by comparing the imagery for object 401 with one or more location estimates for a wireless terminal; if the object and the wireless terminal appear to be collocated and staying proximate to each other (e.g., the terminal is on a person or in a vehicle, etc.), then it can be said that a relationship exists. For pedagogical purposes, a relationship is determined to exist between object 401 and terminal 101-1; however, another possible outcome would be that no relationship is determined to exist between a particular object of interest and a particular wireless terminal, in which case the wireless terminal is irrelevant in tracking the object of interest.

As those who are skilled in the art will appreciate after reading this specification, a different type of relationship than one of colocation can be determined to exist between an object and a wireless terminal. For example and without limitation, a temporal relationship can be determined to exist, based on when P objects of interest arrive at region 210 (or leave region 220) and when Q wireless terminals appear, wherein P and Q are positive integers of equal or different values.

In some embodiments of the present invention, the relationship can be determined based on the information that concerns object 401 received at task 603. Engine 113 can determine in some embodiments that a relationship exists, while in some other embodiments engine 113 determines one or more characteristics about a relationship that is found to exist. In some embodiments of the present invention, tracking engine 113 determines that a relationship exists by estimating, with or without a specified degree of confidence, the existence of such a relationship.

In accordance with the illustrative embodiment of the present invention, an object of interest and a wireless terminal are different entities. As those who are skilled in the art will appreciate after reading this specification, in some alternative embodiments of the present invention a wireless terminal itself might be an object of interest. Alternatively, a first wireless terminal might be an object of interest, wherein tracking engine 113 determines a relationship between the first wireless terminal in this context and a second wireless terminal.

At task 705, tracking engine 113 detects or receives information about one or more patterns that involve one or more wireless terminals (e.g., terminal 101-1, etc.). In some embodiments of the present invention, a pattern exhibits a power-on condition of the wireless terminal occurring at a wireless coverage area provided by a base station, such as wireless terminal 101-3 powering on within coverage area 441 provided by base station 102-1, for example and without limitation. In some embodiments of the present invention, the wireless coverage area within which the power-on condition occurs is separated from geographic region 220 by at least another wireless coverage area provided by another base station, such as the coverage areas provided by base stations 102-3 through 102-8, for example and without limitation. In addition to exhibiting a power-on condition, the pattern might also exhibit a power-off condition of the wireless terminal within geographic region 210.

In some embodiments of the present invention, a power-on condition occurring can be inferred by tracking engine 113 being able to initially receive one or more Network Measurement Reports (NMR), or equivalent, corresponding to a wireless terminal. Similarly, a power-off condition occurring can be inferred by tracking engine 113 no longer being able to receive such NMRs, or equivalent, for a wireless terminal.

At task 707, tracking engine 113 transmits one or more Mobile-Terminated Location Requests (MTLR) corresponding to one or more wireless terminals (e.g., terminal 101-1, etc.) being served. In some alternative embodiments of the present invention, a different type of message is transmitted. For example and without limitation, the one or more MTLRs transmitted can be based on one or more of i) the location of ingress transit of an object of interest, ii) the appearance of one or more terminals whose indications are received at task 701, iii) the relationship between the one or more objects of interest and the one or more wireless terminals, as determined at task 703, iv) the one or more patterns detected at task 705 and v) a database of one or more wireless terminals (e.g., terminals of interest, etc.), wherein the database could have been independently developed.

In some embodiments of the present invention, tracking engine 113 transmits information to wireless infrastructure 111 that provides assistance (e.g., clues, etc.) as to where location data should be gathered within geographic region 210. For example and without limitation, engine 113 can provide the identities of one or more candidate base stations and/or location areas within which to query the target wireless terminal or terminals. The identities of the base station or stations can be dependent upon the series of one or more images received comprising the object of interest. More specifically, the identities can be based on the object of interest's motion (e.g., relatively straight, relatively winding, etc.), velocity, and/or a different characteristic either derived from the images or otherwise received from system 114.

At task 709, tracking engine 113 generates a series of one or more location estimates of the object of interest within a given time interval, based on one or more MTLRs transmitted at task 707. The generating of the series of location estimates is described below and in FIG. 8. In some embodiments of the present invention, the generating of the estimates can be dependent on the base station or location area within which a wireless terminal associated with the object of interest is estimated to be. For example and without limitation, tracking engine 113 might be receiving Network Measurement Reports (NMR) for a non-empty set of wireless terminals, but might choose to concentrate on estimating the locations of a smaller set of those terminals based on the location of ingress transit estimated at task 605 for one or more objections of interest. In this example, the tracking engine might use NMRs comprising measurements involving base stations at or near the estimated location of ingress transit of the object of interest.

In accordance with the illustrative embodiment of the present invention, the number of location estimates (e.g., for a given object of interest, for all objects of interest, etc.) generated within the given time interval is based on one or more wireless terminals exhibiting a predetermined pattern, such as the one detected or received at task 705. In some embodiments, the number of location estimates within the time interval for a first object of interest (e.g., object 401, etc.) is based on the appearance of more than one wireless terminal (e.g., terminal 101-2 in addition to terminal 101-1, etc.). The generating of one or more location estimates can be based on when some wireless terminals appear, either in an absolute sense of time or in a relative sense of time. In regard to appearances that are relative in time, the estimating of a location of wireless terminal 101-1 might be based on when terminal 101-2 appears in relation to terminal 101-1 appearing.

The number of location estimates (e.g., for a given object being tracked, for all objects being tracked, etc.) generated within the given time interval can be based on information received for one or more objects of interest at task 603. In some other embodiments, the number of MTLRs transmitted within a given time interval at task 707 can be similarly based on one or more of the aforementioned parameters described as affecting the number of location estimates.

At task 711, tracking engine 113 transmits one or more of the location estimates generated at task 709, to a location application.

As those who are skilled in the art will appreciate after reading this specification, the combination of image-based data (i.e., obtained from surveillance system 114) and location estimates can be used in conjunction with a geofence, as is known in the art. For example and without limitation, when an object of interest is determined as having crossed a geofence, an additional action or actions can be put into effect such as, while not being limited to, i) estimating the locations of additional wireless terminals, ii) estimating the locations of additional objects of interest, iii) requesting additional aerial or satellite surveillance data from system 114, and/or iv) dispatching law enforcement resources.

Generating of One or More Location Estimates—

Figure 8:
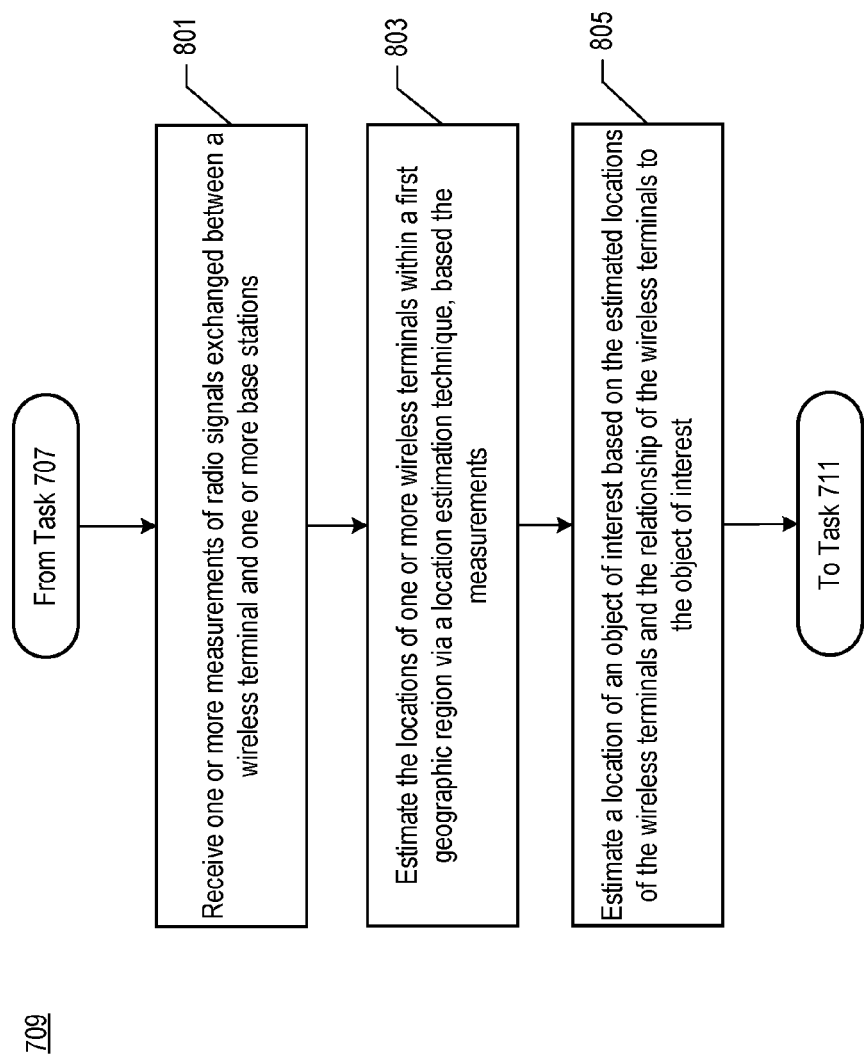
FIG. 8 depicts a flowchart of the salient subtasks of task 709, performed in generating a series of one or more location estimates.

FIG. 8 depicts a flowchart of the salient subtasks of task 709, performed in generating a series of one or more location estimates.

At task 801, tracking engine 113 receives one or more measurements of radio signals exchanged between one or more wireless terminals (e.g., terminal 101-1, terminal 101-2, etc.) and one or more base stations (e.g., station 102-1, station 102-2, station 102-3, etc.). At least some of the measurements are received in response to engine 113 transmitting one or more MTLRs.

At task 803, tracking engine 113 estimates a location of one or more wireless terminals within region 210 via a predetermined location estimation technique, based on one or more of the received measurements. The location estimation technique is capable of providing a first level of accuracy at a location within geographic region 210. In any estimation of location that is attempted within region 220 by the same location estimation technique, only a level of accuracy that is lower than the first level of accuracy is achievable, in some embodiments of the present invention.

There are various techniques that can be used to estimate the location of a wireless terminal based on the received measurements. See for example and without limitation, U.S. Pat. Nos. 6,944,465, 7,460,505, 7,383,051, 7,257,414, 7,753,278, 7,433,695, 7,848,762, and 8,630,665, each of which is incorporated by reference herein. As those who are skilled in the art will appreciate after reading this specification, however, a location estimation technique different from what is disclosed in the foregoing references can be used.

At task 805, tracking engine 113 estimates a location of an object of interest (e.g., object 401, etc.) within region 210 based on the wireless terminal locations estimated at task 803 and on the relationship of the wireless terminals to the object. For example and without limitation, the locations of one or more terminals might be used in one way based on a first set of relationships, the locations might be used in a second way based on a second set of relationships, or a location of a terminal might not be used at all if there is no relationship between that terminal and the object of interest.

Control of task execution then proceeds to task 711.

Tracking of Object of Interest 401 by Providing Information to Surveillance System 114—

FIG. 9 depicts a flowchart of the salient tasks performed in tracking object of interest 401 out of geographic region 210, by providing information to surveillance system 114.

At task 901, tracking engine 113 estimates a location of transit 431 of object 401. Location of transit 431 represents the location at which egress is estimated to occur for object 401 from geographic region 210 into geographic region 220. Engine 113 estimates the location of transit based on one or more of i) a relationship determined at task 703, ii) a pattern detected or received at task 705, iii) one or more location estimates generated at task 709, and iv) a location of transit estimated for a wireless terminal different than terminal 101-1, wherein the other wireless terminal might or might not have a relationship to object 401. In some embodiments of the present invention, the estimate can be based on the motion (e.g., relatively straight, relatively winding, etc.) exhibited by the object of interest and/or any known geography (e.g., mountains, level grounds, etc.).

At task 903, tracking engine 113 estimates a time of transit at which object 401 is expected to be at its location of transit estimated at task 901, based on i) one or more location estimates generated at task 709 and/or ii) an estimate of the velocity of object 401. In some embodiments, the velocity can be estimated based on the progression of the location estimates generated at task 709.

At task 905, tracking engine 113 estimates a means of transit by which object 401 is expected to traverse its location of transit estimated at task 901, based on an estimate of the velocity of object 401. In some embodiments, the velocity can be estimated based on the progression of the location estimates generated at task 709. For example and without limitation, the means of transit can be inferred from an estimated velocity that is commensurate with such means (e.g., on foot inferred from a low velocity, by vehicle inferred from a higher velocity, etc.).

At task 907, tracking engine 113 selects a surveillance system based on one or more of i) one or more locations estimated at task 709, ii) the location of transit estimated at task 901, iii) the time of transit estimated at task 903, iv) the estimated velocity, v) the means of transit estimated at task 905, and a one or more geographic characteristics of the geographic region 210 and/or geographic region 220. In accordance with the illustrative embodiment of the present invention, the surveillance system is selected from a group of systems that are capable of providing services comprising i) satellite imagery service and ii) unmanned aerial vehicle (UAV) imagery service. In some other embodiments, the surveillance system is selected from a group of systems comprising i) image-based surveillance and ii) non-image-based surveillance.

At task 909, tracking engine 113 transmits one or more messages to selected surveillance system 114, wherein the message or messages comprise a first indicium based on the location of transit estimated at task 901. In some embodiments of the present invention, the first indicium can be further based on one or more geographic characteristics of the second geographic region 220.

In some embodiments of the present invention, engine 113 also transmits one or more messages to the selected surveillance system, comprising one or more indicia of the time of transit estimated at task 903 and the means of transit estimated at task 905.

In accordance with the illustrative embodiment of the present invention, the transmitting of one or more messages to surveillance system 114 is based on the estimated location of transit. As those who are skilled in the art will appreciate after reading this specification, however, the transmitting of one or more of the messages can be based on something else, such as a wireless terminal being powered off when it is still within geographic region 210 and experiencing wireless coverage.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of surveillance comprising:
estimating, by a server computer, a first location of a first wireless terminal within a first geographic region, wherein the first geographic region comprises a wireless coverage area that is defined by service coverage provided by one or more base stations, wherein the estimating of the first location is based on a location estimation technique that is capable of providing a first level of accuracy at the first location, and wherein the location estimation technique is based on radio signals exchanged between the first wireless terminal and the one or more base stations;
determining, by the server computer, a relationship between the first wireless terminal and an object of interest;
estimating, by the server computer, a location of transit of the object of interest from the first geographic region into a second geographic region based on i) the first location of the first wireless terminal and ii) the relationship, wherein any estimating of location attempted within the second geographic region via the location estimation technique is characterized as having a lower level of accuracy than the first level;
estimating, by the server computer, a time of transit at which the object of interest is expected to be at its location of transit based on the first location of the first wireless terminal and an estimate of the velocity of the first wireless terminal; and
transmitting, by the server computer, a message to a surveillance system, wherein the message comprises i) a first indicium based on the location of transit of the object of interest and ii) a second indicium of the time of egress.

2. The method of claim 1 further comprising:
estimating, by the server computer, a means of transit by which the object of interest is expected to traverse its location of transit based on an estimate of the velocity of the first wireless terminal;
wherein the message further comprises a third indicium of the means of egress.

3. The method of claim 1 further comprising:
selecting, by the server computer, the particular surveillance system prior to the transmitting of the message to the surveillance system based on the time of transit of the object of interest.

4. The method of claim 3 wherein the surveillance system is selected from a group of systems that are capable of providing services comprising i) satellite imagery service and ii) unmanned aerial vehicle (UAV) imagery service.

5. The method of claim 1 wherein the first indicium is further based a first geographic characteristic of the second geographic region.

6. The method of claim 1 further comprising:
estimating, by the server computer, a second location of a second wireless terminal within the first geographic region; and
estimating, by the server computer, a location of transit of the second wireless terminal from the first geographic region based on the second location;
wherein the first indicium is further based on the location of transit of the second wireless terminal.

7. The method of claim 6 wherein the estimating of the location of transit of the object of interest is further based on the location of transit of the second wireless terminal.

8. The method of claim 1 further comprising:
receiving, by the server computer, an indication of an appearance of a second wireless terminal within the first geographic region, wherein the estimating of the first location is further based on when the indication of the appearance of the second wireless terminal is received.

9. The method of claim 8 further comprising:
receiving, by the server computer, an indication of an appearance of the first wireless terminal within the first geographic region, wherein the estimating of the first location is further based on when the indication of the appearance of the second wireless terminal is received in relation to when the indication of the appearance of the first wireless terminal is received.

10. A method of surveillance comprising:
receiving, by a server computer, a series of images comprising an object of interest, wherein the object of interest is in motion in relation to the background in the series of images, and wherein the object is present within a second geographic region;
estimating, by the server computer, a location of transit of the object of interest from the second geographic region into a first geographic region based on the geography exhibited in the series of images;
transmitting, by the server computer, a mobile-terminated location request (MTLR), corresponding to a first wireless terminal that is being served by a particular base station in the first geographic region, wherein the particular base station is dependent on the location of transit, wherein the first geographic region comprises a wireless coverage area that is defined by service coverage provided by one or more base stations that comprise the particular base station, and wherein the transmitting of the MTLR corresponding to the first wireless terminal is based on the series of images;
estimating, by the server computer, a first location of the first wireless terminal, wherein the estimating of the first location is based on a location estimation technique that is capable of providing a first level of accuracy at the first location, and wherein the location estimation technique is based on radio signals exchanged between the first wireless terminal and the one or more base stations, and wherein the radio signals are made available in response to the MTLR; and
transmitting, by the server computer, the first location to a location application.

11. The method of claim 10 further comprising:
receiving, by the server computer, a message conveying information that concerns the object of interest, wherein the information is derived from the series of images;
receiving, by the server computer, an indication of an appearance of the first wireless terminal within the first geographic region; and
determining, by the server computer, a relationship between the object of interest and the first wireless terminal, based on the information that concerns the object of interest;
wherein the transmitting of the MTLR corresponding to the first wireless terminal is based on the relationship.

12. The method of claim 10 wherein the location of transit is further based on motion exhibited in the series of images by the object of interest.

13. The method of claim 10 wherein any estimating of location attempted within the second geographic region via the location estimation technique is characterized as having a lower level of accuracy than the first level.

14. A method of surveillance comprising:
  receiving, by a server computer, a series of images comprising an object of interest, wherein the object of interest is in motion in relation to the background in the series of images, and wherein the object is present within a second geographic region;
  receiving, by the server computer, a message conveying information that concerns the object of interest, wherein the information is derived from the series of images;
  receiving, by the server computer, an indication of an appearance of a first wireless terminal within a first geographic region;
  determining, by the server computer, a relationship between the object of interest and the first wireless terminal, based on the information that concerns the object of interest;
  transmitting, by the server computer, a mobile-terminated location request (MTLR), corresponding to the first wireless terminal that is being served by a particular base station in the first geographic region, wherein the first geographic region comprises a wireless coverage area that is defined by service coverage provided by one or more base stations that comprise the particular base station, and wherein the transmitting of the MTLR corresponding to the first wireless terminal is based on i) the series of images and ii) the relationship between the object of interest and the first wireless terminal;
  estimating, by the server computer, a first location of the first wireless terminal, wherein the estimating of the first location is based on radio signals exchanged between the first wireless terminal and the one or more base stations, and wherein the radio signals are made available in response to the MTLR; and
  transmitting, by the server computer, the first location to a location application.

15. The method of claim 14 further comprising:
  estimating, by the server computer, a second location of transit of the object of interest from the first geographic region into the second geographic region based on i) the first location of the first wireless terminal and ii) the relationship, wherein the estimating of the first location is further based on a location estimation technique that is capable of providing a first level of accuracy at one or more of the locations in the series of estimates, and wherein any estimating of location attempted within the second geographic region via the location estimation technique is characterized as having a lower level of accuracy than the first level; and
  transmitting, by the server computer, a message to a surveillance system, wherein the message comprises a first indicium based on the second location of transit of the object of interest.

16. The method of claim 14 further comprising estimating, by the server computer, a first location of transit of the object of interest from the second geographic region into the first geographic region based on the series of images, wherein the particular base station is dependent on the first location of transit.

17. The method of claim 16 wherein the first location of transit is further based on motion exhibited in the series of images by the object of interest.

* * * * *